United States Patent [19]

Loucks

[11] Patent Number: 5,742,113
[45] Date of Patent: Apr. 21, 1998

[54] DEVICE FOR TILT-FREE TRANSLATION OF ONE PLATE RELATIVE TO A REFERENCE PLATE

[75] Inventor: Bryan E. Loucks, Los Altos Hills, Calif.

[73] Assignee: K Laser Technology, Inc., Hsinchu, Taiwan

[21] Appl. No.: 646,048

[22] Filed: May 7, 1996

[51] Int. Cl.$^6$ .............................. H02N 2/00; H01L 41/08
[52] U.S. Cl. ............................................. 310/328
[58] Field of Search ................................. 310/328

[56] References Cited

U.S. PATENT DOCUMENTS

| | | | |
|---|---|---|---|
| 3,377,489 | 4/1968 | Brisbane | 310/328 |
| 3,684,904 | 8/1972 | Galutva et al. | 310/328 |
| 4,884,003 | 11/1989 | Hayes | 310/328 |
| 4,928,030 | 5/1990 | Culp | 310/328 |
| 5,068,566 | 11/1991 | Culp | 310/328 |
| 5,594,330 | 1/1997 | Jacobsen | 310/328 |

FOREIGN PATENT DOCUMENTS

| | | | |
|---|---|---|---|
| 60-229680 | 11/1985 | Japan | 310/328 |
| 63-244205 | 10/1988 | Japan | 310/328 |
| 2-46178 | 2/1990 | Japan | 310/328 |

*Primary Examiner*—Thomas M. Dougherty
*Attorney, Agent, or Firm*—Herbert M. Shapiro

[57] ABSTRACT

A device for the tilt-free movement of one solid body with respect to a reference body is achieved by fixing first and second plates, illustratively with large central apertures, in spaced-apart parallel planes with cylindrical flexure tubes sandwich therebetween. Each of the flexure tubes includes an upstanding piezoelectric or electro-strictive cylinder therewithin. The flexure tubes are aligned radially from the common central axis of the plates and are conveniently at 120 degree angles with respect to one another to achieve symmetry. The piezoelectric cylinders are responsive to like voltage signals to expand or contract in a manner to expand or contract the diameter of the flexure tube to produce the desired tilt-free movement of one plate with respect to the other. The flexure tubes, although small, are very strong due to the cylindrical geometry and yet, are responsive to relatively low signal levels for producing the requisite expansion and contraction.

8 Claims, 3 Drawing Sheets

DEVICE FOR TILT-FREE TRANSLATION OF ONE PLATE RELATIVE TO A REFERENCE PLATE

FIELD OF THE INVENTION

This invention relates to a (Fizeau) phase measuring translation device for precision movement of solid bodies as might be useful, for example, in microscopes, opto-mechanical devices, interferometers and the like.

BACKGROUND OF THE INVENTION

Various devices are available commercially for precise movement of an object. U.S. Pat. No. 3,684,904, for example, describes one such device. The purpose of the device there described is to avoid friction that affects the accuracy of motion as is characteristic of prior art devices of this type. The device employs two spaced-apart plates with at least two elastic supports sandwiched between the plates and affixed to the movable one of the plates. The supports are constructed of piezoelectric materials and are operative responsive to voltage inputs to lengthen or contract to adjust the position of the movable plate. The device employs a piezoelectric transducer in each support each one of which includes a stack of piezoelectric disks. Although the device is free of friction, it exhibits mechanical vibration.

U.S. Pat. No. 4,884,003 describes a micro-motion translator which employs first and second parallel plates and is operative to move, in a tilt-free manner, the second plate with respect to the first which is a fixed position reference plate. The translator employs three upstanding piezoelectric tubes the ends of which fit into recesses in the two plates. The two plates also sandwich a large area flexure plate which is fixedly attached in an asymmetrical fashion to the first plate at one end and to the second plate at the other end. The flexure plate is operative to eliminate mechanical vibration also characteristic of like prior art devices.

The flexure plate in the device of the later patent is rigidly designed in a prescribed fashion to reduce mechanical vibration. But, the design of the flexure plate is asymmetrical which introduces tilt into any translation. That tilt must be corrected by the driving circuit for the piezoelectric (PZT) tubes thus leading to a relatively complicated and expensive drive circuit.

BRIEF DESCRIPTION OF THE INVENTION

In accordance with the principles of the present invention, a tilt-free and symmetrical translation device is realized in the absence of a large flexure plate. Also realized is a relatively simple drive circuit which need not correct for tilt. The device, in one illustrative embodiment, comprises first and second plates having first and second central apertures respectively. The plates are held in stable positions in spaced-apart parallel planes by three cylindrical flexure tubes each having an axis parallel to the planes of the plates with the axes aligned with the center of the central apertures. Each flexure tube includes an upstanding piezoelectric (PZT) element within it. Voltage signals are applied to the PZTs controllably to increase or reduce the diameter of the tubes to provide the desired tilt-free motion of the non-fixed one of the plates with respect to the fixed-position reference plate.

The flexure tubes, although quite small, provide significant stiffness because of the tubular geometry thereof and thus are suitable for heavy loads. Further, the positions of the flexure tubes provide stiffness in all orientations unlike devices of the prior art. Consequently, a "weak" axis does not exist for devices in accordance with the principles of this invention.

Further, the geometrical arrangement requires a minimum of low cost parts to fabricate. The embodiment shown, for example, includes top and bottom plates, the cylindrical flexure tubes, the piezoelectric elements and minor mounting hardware.

The symmetry of the positions of the flexure tube assemblies and the use of low voltage PZTs permit great simplification of the control circuitry. Because the flexure assemblies are symmetrically placed, one voltage signal may be used to drive the three assemblies. Each PZT responds equally, within respective manufacturing tolerances, to the drive signal for tilt-free translation. The use of low voltage PZTs also reduces the number of electronic devices required to generate the drive signal. In prior art devices, a computer generated drive signal is fed into a high voltage amplifier the output of which is fed into a balance circuit that drives each PZT in turn. The low voltage PZTs used herein may be driven directly by the computer generated drive signal without further amplification.

DETAILED DESCRIPTION OF AN ILLUSTRATIVE EMBODIMENT OF THIS INVENTION

Figure 2:
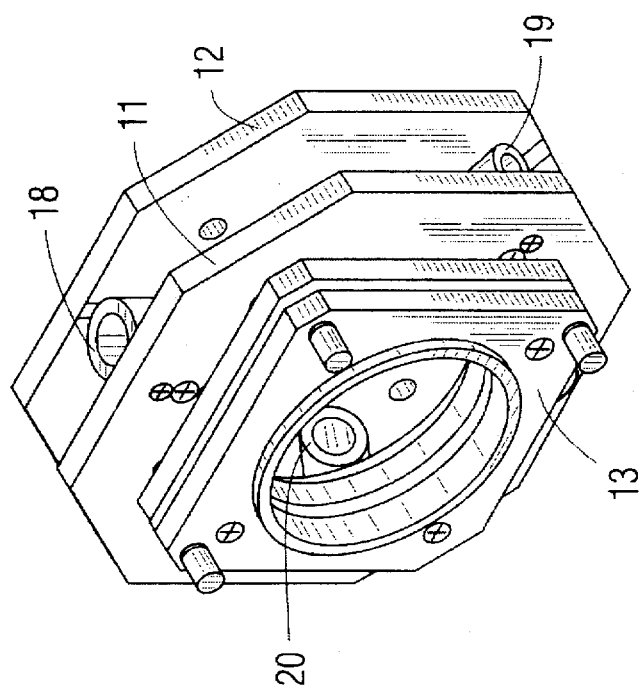
FIGS. 1 and 2 are exploded and assembled isometric views of a translation device in accordance with the principles of this invention.
Figure 1:
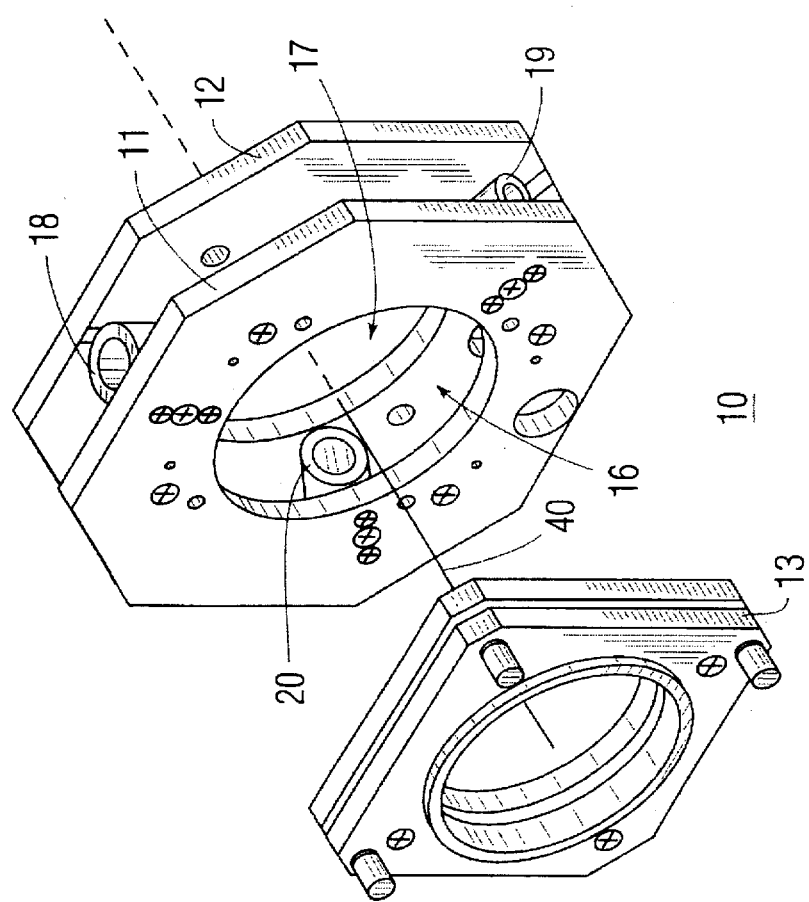

FIG. 1 is an exploded view of a device 10 for achieving tilt-free movement of a first plate 11 with respect to a reference plate 12. The device conveniently includes a bracket 13 for attaching anyone of a number of instruments commonly used with such devices as will become more apparant hereinafter. FIG. 2 shows the device and the bracket interconnected.

Each plate conveniently has a large central aperture, 16 and 17 for plates 11 and 12 respectively. The apertures are present only to provide a path for light. But other means for providing a light path are available as is clear to one skilled in the art and the apertures are not necessary.

Importantly, in accordance with the principles of this invention, three tubes (flexures) 18, 19, and 20 are positioned symmetrically between plates 11 and 12. Illustratively, the tubes are aligned radially at 120 degree angles with respect to one another. Because of this symmetrical positions of the flexures, no tilt is introduced during movement of plate 11 with respect to plate 12.

Figure 3:
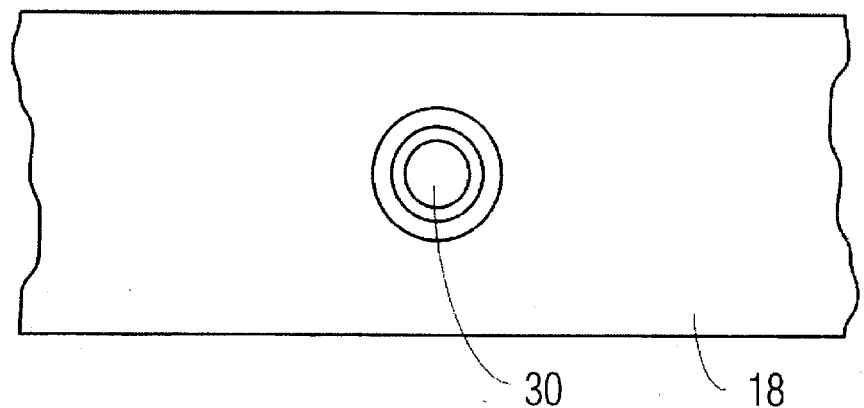
FIGS. 3 and 4 are schematic top and side views of cylindrical flexure portions of the device of FIGS. 1 and 2.
Figure 4:
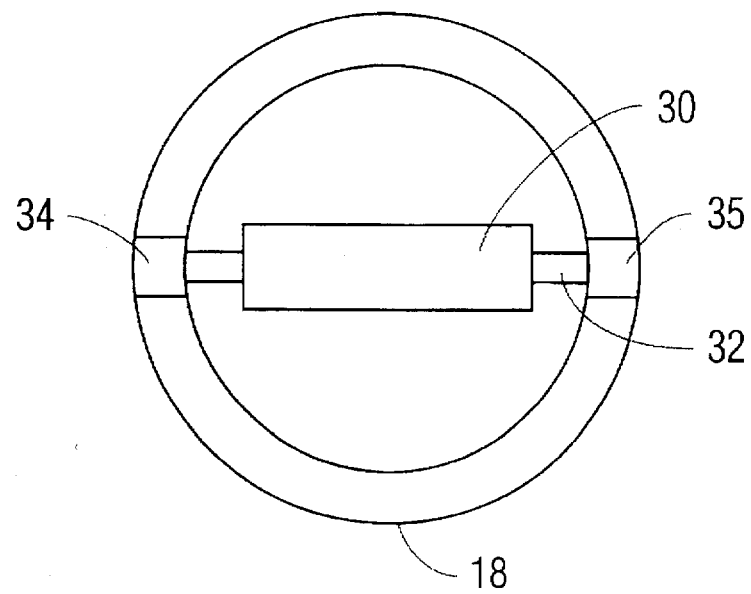

Movement of plate 11 is achieved by applying a like voltage to each of the three PZT (or magnetostrictive) elements within the three flexure tubes 18, 19 and 20. FIGS. 3 and 4 show, schematically, an end view and a side view, respectively, of a PZT element 30 within one of the flexure tubes (18) of FIGS. 1 and 2. The PZT element may be tubular or solid and conveniently is aligned along an axis normal to the planes of plates 11 and 12. In a prototype device, the PZT elements were solid and terminated at each end thereof with studs (32) which inserted into apertures in the walls of the associated flexure tube (18) as indicated in FIG. 4. The PZT element is secured in place by a tap screw (not shown) which is turned within aperture 35 to fix the position of PZT element 30. It has been found that the application of like voltages to the PZT elements causes the elements to elongate and shorten in a manner to cause tubes 18, 19 and 20 to increase and to decrease in a manner to move plate 11 in a tilt-free manner. Further, the entire diameter of the flexure tube increases and decreases in response even though the expansion and contraction of the PZT elements occurs only at the apertures (34 and 35) which secure the positions of the PZTs within the flexure tubes. The mathematics for confirming such results can be found in A. J. Durelli and Y. H. Lin "Stresses and Displacements on the Boundaries of Circular Rings Diametrically Loaded", Journal of Applied Mechanics, March 1986, Vol 53, pp 213–219.

The symmetry of the device is the key to achieving tilt-free movement and the avoidance of the prior art need for a balancing circuit. The symmetry is provided by the arrangement of the tube (18, 19 and 20) and the arrangement of the PZT elements. The tubes, illustratively, are aligned radially from the central axis 40 of the plates, as indicated in FIG. 1, at 120 degree angles with respect to one another. But such alignment is not necessary. The tubes can be arranged in any orientation between the plates so long as they are symmetrically positioned.

Further, the PZT elements are shown, illustratively, to be oriented along an axis normal to the plane of the plates. Again, such an orientation is merely illustrative. The elements may be aligned at any angle with repect to those planes and may even be aligned parallel to those planes. Still expansion or contraction of the PZT elements will result in the expansion and contraction of the flexure tube diameters as required.

The symmetry is provided by the flexure tubes (18, 19 and 20) and a minimum number of tubes is necessary to achieve tilt-free movement of plate 11. The fact that the flexure tubes are tubular also ensures a rigid and structurally strong device. In a prototype device, plates 11 and 12, illustratively, were octagonal in shape as shown in FIGS. 1 and 2 having dimensions of 10.56 inches (outside diameter) 5.375 inches (inside diameter) by 5 inches thick and were made of aluminum. Tubes 18, 19, and 20 (each) were one and one half inch in diameter, 1.75 inches long and one quarter inch thick, also of aluminum. The PZT elements were tubes made of Queensgate MT-15 or equivalent. The device scales in size and can be made quite large for manipulating large objects. Additional flexures may be added, as necessary, for strength.

Figure 5:
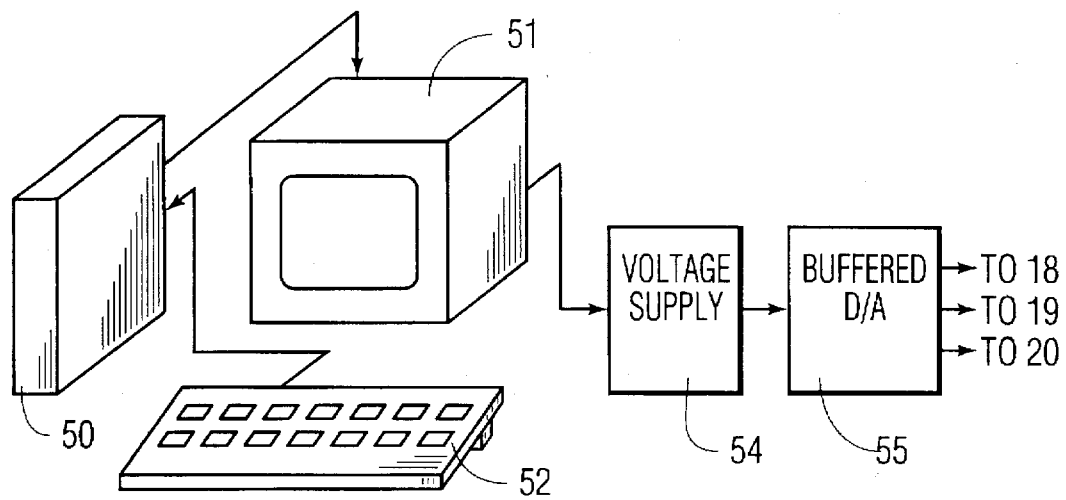
FIG. 5 is a schematic block diagram of a circuit for controlling the micromotion device as shown in FIGS. 1 and 2.

FIG. 5 shows a control circuit for the device of FIGS. 1 through 4. Specifically, FIG. 5 shows a computer 50 with monitor 51 and keyboard 52 for operator selection of voltages for the PZT elements. The computer is connected to a voltage supply 54, the output of which is connected to the PZT elements (18, 19 and 20) via a digital to analog (D/A) converter 55 as shown in the figure. The use of low voltage PZT elements allows the computer to drive the PZT elements directly through a buffered D/A card without requiring the use of a special PZT amplifier or balance circuit as is required of prior art devices.

Figure 6:
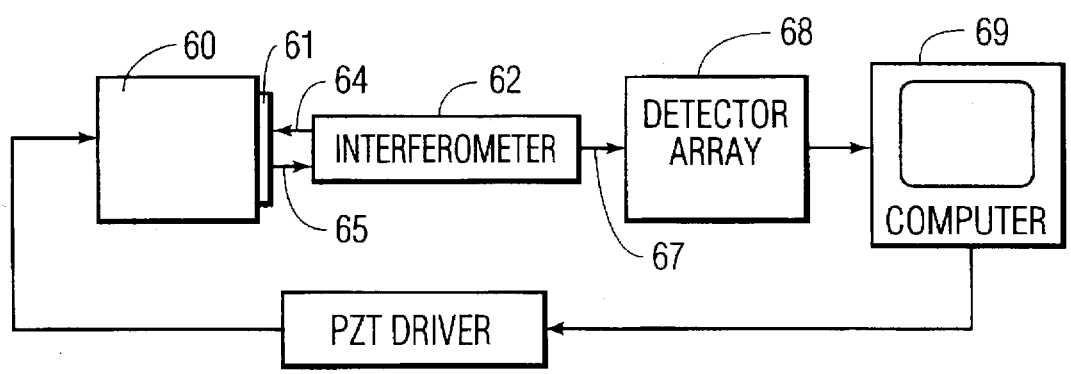
FIG. 6 is a schematic block diagram of a system using the micromotion device of FIGS. 1 and 2.

FIG. 6 shows a system for using the device of FIGS. 1 and 2. The system includes a micromotion device 60 in accordance with the principles of this invention. A planar test surface 61 is positioned (by bracket 13 of FIGS. 1 and 2) as shown. An interferometer 62 produces a beam 64 that is reflected by surface 61 as indicated by arrow 65. The interferometer generates a beam 67 with an interference pattern representative of the reference beam (64) and the reflected beam (65). The pattern is detected by detector array 68. Array 68, in turn, generates signals which are converted to digital signals and received by computer 69. Computer 69 also controls the PZT driver to adjust (expand or contract) the PZT elements (18, 19, and 20) in device 60. The operation of the system is analogous to that of prior art systems and is not described further herein.

What is claimed is:

1. A device for precision displacement of a second plate with respect to a first plate, said device comprising said first and second plates, said plates being arranged in parallel and spaced-apart planes with a common central axis, said device also including first, second and third tubular flexure assemblies, said flexure assemblies being sandwiched between said first and second plates and arranged symmetrically therebetween, each of said flexure assemblies including therein signal responsive elements aligned along the diameter thereof and being capable of expansion or contraction in response to said signal, said device also including signal generating means responsive to operator input for applying like voltage signals to said elements for producing like expansion or contraction of the diameters of said flexure assemblies controllably.

2. A device as in claim 1 wherein each of said first and second plates contains a large central aperture.

3. A device as in claim 1 wherein each of said signal responsive elements is a piezoelectric element.

4. A device as in claim 3 wherein said flexure assemblies are arranged radially from said central axis of said plates at 120 degree angles with respect to one another.

5. A device as in claim 3 wherein each of said piezoelectric elements is oriented within an associated one of said flexure assemblies along an axis normal to the plane of said first and second plates.

6. A device as in claim 2 wherein each of said signal responsive elements is a piezoelectric element.

7. A device as in claim 6 wherein said flexure assemblies are arranged radially from said central axis of said plates at 120 degree angles with respect to one another.

8. A device as in claim 2 wherein each of said piezoelectric elements is oriented within an associated one of said flexure assemblies along an axis normal to the planes of said first and second plates.

* * * * *